United States Patent
Mondragon et al.

(10) Patent No.: US 11,354,212 B2
(45) Date of Patent: Jun. 7, 2022

(54) COMPONENT INSTALLATION VERIFICATION

(71) Applicant: International Business Machines Corporation, Armonk, NY (US)

(72) Inventors: Ayrton Didhier Mondragon, Guadalajara (MX); Salvador Perez Pena, Zapopan (MX); Pablo Sanchez Orozco, Guadalajara (MX); Gabriel Padilla, Guadalajara (MX)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 16/830,654

(22) Filed: Mar. 26, 2020

(65) Prior Publication Data

US 2021/0303433 A1 Sep. 30, 2021

(51) Int. Cl.
| | |
|---|---|
| *G06F 11/00* | (2006.01) |
| *G06F 11/30* | (2006.01) |
| *G06F 9/54* | (2006.01) |
| *G06F 11/32* | (2006.01) |
| *G06F 11/22* | (2006.01) |

(52) U.S. Cl.
CPC ......... *G06F 11/3089* (2013.01); *G06F 9/542* (2013.01); *G06F 11/2236* (2013.01); *G06F 11/3003* (2013.01); *G06F 11/32* (2013.01)

(58) Field of Classification Search
CPC .. G06F 11/3089; G06F 11/32; G06F 11/3003; G06F 11/2236; G05B 13/04; G05B 2219/32228
See application file for complete search history.

(56) References Cited

U.S. PATENT DOCUMENTS 5,841,287 A  11/1998  Duley
6,049,740 A * 4/2000  Whitehead ........... G01R 31/309
                                                356/392

(Continued)

FOREIGN PATENT DOCUMENTS

CN  201556608 U  8/2009
EP  1015981 B1  3/2004

OTHER PUBLICATIONS

Anonymous "Method for quick optical verification of CPU socket/PCB alignment", An IP.com Prior Art Database Technical Disclosure, IP.com No. IPCOM000146400D IP.com Electronic Publication Date: Feb. 13, 2007, 4 pages.

(Continued)

*Primary Examiner* — Charles Ehne
(74) *Attorney, Agent, or Firm* — Sonny Z. Zhan (57) ABSTRACT

In an approach for a component installation, a processor receives sensor data from a sensor scanning a component. The component is to be installed into a receptacle. A processor compares the sensor data to reference data. The reference data is pre-collected data associated with the type of the component and the type of the receptacle. The reference data defines the correct type of the component to be installed in the receptacle. The reference data defines a damage status of the type of the component. A processor determines whether the component has damage. A processor determines whether the component is a correct type of component to be installed in the receptacle. A processor provides an indication for installation.

20 Claims, 8 Drawing Sheets

(56) References Cited

U.S. PATENT DOCUMENTS

| | | | | |
|---|---|---|---|---|
| 6,223,147 | B1* | 4/2001 | Bowers | G11C 5/00 |
| | | | | 703/21 |
| 6,542,630 | B1* | 4/2003 | Sherwood | G01R 31/309 |
| | | | | 348/87 |
| 7,314,392 | B2 | 1/2008 | Pham et al. | |
| 2006/0064526 | A1 | 3/2006 | Smith et al. | |
| 2011/0205078 | A1 | 8/2011 | Hua et al. | |
| 2019/0122015 | A1* | 4/2019 | Huang | H05K 7/1498 |
| 2019/0174207 | A1* | 6/2019 | Cella | H04Q 9/00 |

OTHER PUBLICATIONS

IBM et al., "Method of Plugging and Checking the Integrity of Highly Dense, Discretely Wired Computer Backpanels", An IP.com Prior Art Database Technical Disclosure, IP.com No. IPCOM000047710D, IP.com Electronic Publication Date: Feb. 8, 2005, 3 pages.

IBM, "Connector Pin Damage Verification through Laser Scanning", An IP.com Prior Art Database Technical Disclosure, IP.com No. IPCOM000138242D, IP.com Electronic Publication Date: Jul. 11, 2006, 3 pages.

\* cited by examiner

COMPONENT INSTALLATION VERIFICATION

BACKGROUND

The present disclosure relates generally to the field of electric component installation, and more particularly to processor installation verification.

A motherboard may connect different hardware components like a central processing unit (processor), RAM memory modules, hard disk drives, and a graphics card. The motherboard may enable the hardware components to work together in a properly synchronized manner. A motherboard may also help to connect external peripherals, like a monitor, a mouse, and a keyboard, to a computer. A processor may be installed to the motherboard via a socket and may be thermally protected using a heat sink. A factor that may determine what processor a user can install is the socket type of the motherboard.

SUMMARY

Aspects of an embodiment of the present disclosure disclose an approach for a component installation. A processor receives sensor data from a sensor scanning a component. The component is to be installed into a receptacle. A processor compares the sensor data to reference data. The reference data is pre-collected data associated with the type of the component and the type of the receptacle. The reference data defines the correct type of the component to be installed in the receptacle. The reference data defines a damage status of the type of the component. A processor determines whether the component has damage. A processor determines whether the component is a correct type of component to be installed in the receptacle. A processor provides an indication for installation.

DETAILED DESCRIPTION

The present disclosure is directed to systems and methods for a component installation verification and guidance.

Embodiments of the present disclosure recognize a verification need for component installation, e.g., module or processor chip installation to a motherboard. For example, module installation may be a manual process which can have human errors causing physical damage in sockets, bent pins in sockets, and sometimes damage to the module itself. Embodiments of the present disclosure disclose an infrared sensor for verification on a module installation based on a pin count and/or pin diagram to avoid misplacing the module under certain conditions. The infrared sensor is used to verify module installation.

Embodiments of the present disclosure may verify and check if a component, for example a processor chip, being installed is the right component for the receptacle, for example a motherboard under production using the sensor data. When the processor chip is positioned to be close to the motherboard, the sensor can scan the processor chip and send the scanned data to a microprocessor that may process the data and validate the processor chip to be a correct processor chip or an incorrect component. If the processor chip is determined a correct processor chip, the microprocessor may send a signal to turn on a notification, e.g., a green LED, indicating that it is safe to continue with the installation of the processor chip to the motherboard. If the processor chip is determined to be an incorrect one, the microprocessor may send a signal to turn on a notification, e.g., a red LED, indicating that the installation should stop. If the processor chip is determined to be damaged, the microprocessor may send a signal to turn on a red led indicating that the installation should stop.

In one or more embodiments, the microprocessor and sensor may require little energy to function, so no external battery is needed for the microprocessor and sensor to work. In other embodiments, the microprocessor and sensor may use power through external direct battery.

Figure 1:
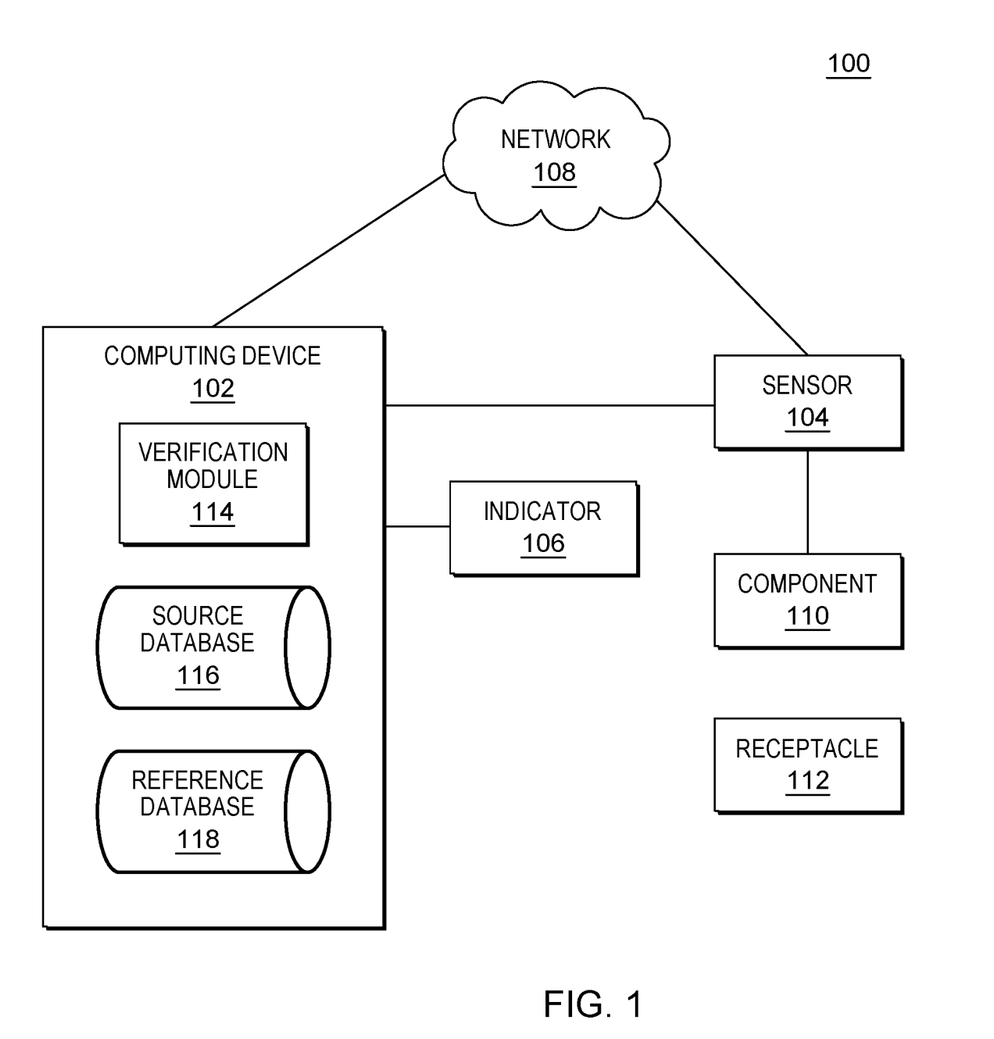
FIG. 1 is a functional block diagram illustrating a component installation verification environment, in accordance with an embodiment of the present disclosure.

The present disclosure will now be described in detail with reference to the Figures. FIG. 1 is a functional block diagram illustrating a component installation verification environment, generally designated 100, in accordance with an embodiment of the present disclosure.

In the depicted embodiment, component installation verification environment 100 includes computing device 102, sensor 104, indicator 106, and network 108. Component installation verification environment 100 also includes component 110 and receptacle 112. Component 110 is a component to be installed into receptacle 112. In an example, component 110 can be a module to be installed into receptacle 112. In another example, component 110 can be a processor or processor chip. In yet another example, component 110 can be an integrated circuitry chip. In yet another example, component 110 can be any component that is arranged to be installed into receptacle 112. In one or more embodiments, component 110 can have one or more pins associated with receptacle 112 for installation. In another example, the one or more pins can be pads to be associated with receptacle 112 for installation. The one or more pins can have a diagram which can be used to identify component 110 or the same type of the component to be installed for receptacle 112. In another example, the number of the one or more pins can be a number that can identify component 110 or the same type of the component to be installed for receptacle 112. An example component 110 with a plurality of pins are further illustrated in FIG. 2.

In one or more embodiments, receptacle 112 can be an electric circuitry system that component 110 is to be installed into. In an example, receptacle 112 can be a motherboard to accept component 110. In an example, receptacle 112 may have a socket with associated contact surface to accept component 110 with the associated pins of component 110. In another example, receptacle 112 may have a socket with associated holes to accept component 110 with the associated pins of component 110. The socket can be designed to accept a correct component or the same type of the component for receptacle 112. In another example, receptacle 112 may have suitable element to accept component 110. Receptacle 112 can be designed to accept a correct component or the same type of the component for receptacle 112.

In an example, component 110 can be a processor and receptacle 112 can be a motherboard to accept component 110. In an example, pins can be physically located on the processor. The pins on the processor can be lined up with surface contacts on the motherboard. In another example, the motherboard can have holes and the processor pins can be inserted into the holes on the motherboard. In another example, pins can be attached to the motherboard. The pins may line up with holes on the processor, and the processor may be fitted onto the motherboard's pins.

In various embodiments of the present disclosure, sensor 104 is configured to scan component 110. Sensor 104 may be separated from component 110 and indicator 106. Sensor 104 may be located outside component 110. Sensor 104 may scan component 110 before component 110 is to be installed into receptacle 112. Sensor 104 may scan elements in component 110. For example, sensor 104 may scan a plurality of pins of component 110. The plurality of pins can have a certain number, pattern and diagram which can be used to identify component 110 or the same type of component 110 for receptacle 112. Sensor 104 may send the scanned data to computing device 102. In an example, sensor 104 can be an infrared sensor. The infrared sensor may be an electronic instrument that is used to sense certain characteristics of component 110. The infrared sensor may sense component 110 by emitting and detecting infrared radiation. In another example, sensor 104 can be an optical sensor that can sense certain characteristics of component 110. In yet another example, sensor 104 can be any suitable sensor that can capture certain characteristics of component 110. Sensor 104 may be located outside component 110 and be able to capture certain characteristics of component 110, e.g., by scanning the pins of component 110. In yet another example, sensor 104 can be any suitable sensor that can scan and capture data of component 110 or the same type of component 110 to check and verify if any damage is in component 110.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In some embodiments, computing device 102 is a microprocessor that requires minimum or very little energy to function. In an example, no external battery is needed for the microprocessor. In general, computing device 102 can be any computing device or a combination of devices with access to verification module 114, source database 116, reference database 118, and network 108 and is capable of processing program instructions and executing verification module 114, in accordance with an embodiment of the present disclosure. Computing device 102 may include internal and external hardware components, as depicted and described in further detail with respect to FIG. 7.

Further, in the depicted embodiment, computing device 102 includes verification module 114, source database 116, and reference database 118. In the depicted embodiment, verification module 114, source database 116, and reference database 118 are located on computing device 102. However, in other embodiments, verification module 114, source database 116, and reference database 118 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and verification module 114, source database 116, and reference database 118, in accordance with a desired embodiment of the disclosure.

In one or more embodiments of the present disclosure, verification module 114 is configured to receive sensor data from sensor 104 when sensor 104 scans component 110. In an example, sensor 104 may scan component 110 when component 110 is put on top of receptacle 112. In another example, sensor 104 may automatically scan component 110 when sensor 104 detects component 110. In yet another example, verification module 114 may trigger sensor 104 to scan component 110 when component 110 approaches receptacle 112. In an example, verification module 114 may save sensor data received from sensor 104 into source database 116 when sensor 104 scans component 110. In another example, verification module 114 may process sensor data received from sensor and save the processed sensor data into source database 116.

In one or more embodiments of the present disclosure, verification module 114 is configured to process the sensor data received from sensor 104. Verification module 114 may process the sensor data received from sensor 104 via calculating the number of pins in component 110. Verification module 114 may process sensor data received from sensor 104 via capturing the pattern of the number of the pins in component 110. Verification module 114 may process sensor data received from sensor 104 via capturing the diagram of the number of the pins in component 110. Verification module 114 may save the processed sensor data into source database 116.

In one or more embodiments of the present disclosure, verification module 114 is configured to compare sensor data received from sensor 104 to reference data from reference database 118. Verification module 114 may compare source database 116 to reference database 118. Verification module 114 may compare the processed sensor data received from sensor 104 to reference data from reference database 118. Reference database 118 may be a pre-collected data associated with component 110 and receptacle 112. The pre-collected data can identify component 110. For example, reference database 118 can be used as a comparison to identify whether component 110 or the same kind of the component is a correct component to be supposed to be installed in receptacle 112. Reference database 118 may be a database that includes reference data that may be pre-defined data associated with receptacle 112 and component 110. In an example, the pre-defined data for reference database 118 can be pre-collected through sensor 104 by scanning a pre-verified component and or pre-verified type of components for installation for receptacle 112. In another example, the pre-defined data for reference database 118 can be collected through other suitable methods for a pre-verified component and or pre-verified type of components for installation for receptacle 112. The pre-defined data may be reference data which can indicate a correct type of components 110 for installation for receptacle 112 by the number of pins in the correct type of components 110. The pre-defined data may be reference data which can indicate a correct type of components 110 for installation for receptacle 112 by a pattern of the number of pins in the correct type of components 110. The pre-defined data may be reference data which can indicate a correct type of components 110 for installation for receptacle 112 by a diagram of the number of pins in the correct type of components 110. The pre-defined data may be reference data which defines a physical damage status for component 110 or the type of component 110. In an example, the pre-defined data may be reference data which can indicate a type of components 110 with no damage by the number of pins in the correct type of components 110. The pre-defined data may be reference data which can indicate a type of components 110 with no damage by a pattern of the number of pins in the correct type of components 110. The pre-defined data may be reference data which can indicate a type of components 110 with no damage by a diagram of the number of pins in the correct type of components 110.

In one or more embodiments of the present disclosure, verification module 114 is configured to determine whether component 110 has damage or not. In an example, the damage can be physical damage in one or more pins of component 110. In another example, the damage can be damage with one or more missing pins of component 110. In yet another example, the damage can be one or more bent pins, bent damage in component 110 or other physical damage in component 110. Verification module 114 may determine that component 110 has no damage by finding a match between sensor data from sensor 104 and reference data from reference database 118. The reference data may be a pre-defined data defining a non-damage status (e.g., no physical damage or missing parts) for the same type of component 110. For example, if verification module 114 finds the sensor data from sensor 104 matching the reference data from reference database 118, verification module 114 may determine that component 110 has no damage. In an example, the pre-defined data can be the number of pins for the same type of component 110. If the number of pins based on sensor data scanned from component 110 in source database 116 is the same as the number of pins in the pre-defined data in reference database 118, verification module 114 may determine that component 110 has no damage. If the number of pins based on sensor data scanned from component 110 in source database 116 is different than the number of pins in the pre-defined data in reference database 118, verification module 114 may determine that component 110 may be missing one or more pins and may have been damaged. If the number of pins, based on sensor data scanned from component 110 in source database 116, is a mismatch with the number of pins in the pre-defined data in reference database 118, verification module 114 may determine that component 110 may be missing one or more pins and may have been damage. In another example, the pre-defined data can be a pattern and diagram of the plurality of pins for the same type of component 110. If the pattern and diagram, based on sensor data sensor data scanned from component 110 in source database 116, matches the pattern and diagram in the pre-defined data in reference database 118, verification module 114 may determine that component 110 has no damage. If the pattern and diagram, based on sensor data sensor data scanned from component 110 in source database 116, fails to match the pattern and diagram in the pre-defined data in reference database 118, verification module 114 may determine that component 110 may have damage. If the pattern and diagram, based on sensor data sensor data scanned from component 110 in source database 116, is a mismatch with the pattern and diagram in the pre-defined data in reference database 118, verification module 114 may determine that component 110 may have damage.

In one or more embodiments of the present disclosure, verification module 114 is configured to determine whether component 110 is a correct component or a correct type of the component to be installed in receptacle 112. Verification module 114 may determine component 110 is a correct component to be installed in receptacle 112 when sensor data sensor data from source database 116 matches reference database 118. Verification module 114 may determine that component 110 is a correct type of component to be installed in receptacle 112 by finding a match between sensor data from sensor 104 and pre-defined data from reference database 118. The pre-defined data may define the correct type of components to be installed in receptacle 112. For example, if verification module 114 finds the sensor data sensor data from sensor 104 matches the pre-defined data from reference database 118, the pre-defined data defining the correct type of components to be installed in receptacle 112, verification module 114 may determine that component 110 is a correct component to be installed in receptacle 112. In an example, the pre-defined data can be the number of pins for the same type of component 110. If the number of pins based on sensor data sensor data scanned from component 110 in source database 116 is the same as the number of pins in the pre-defined data in reference database 118, verification module 114 may determine that component 110 is a correct component to be installed in receptacle 112. If the number of pins based on sensor data sensor data scanned from component 110 in source database 116 is different from the number of pins in the pre-defined data in reference database 118, verification module 114 may determine that component 110 is not a correct component to be installed in receptacle 112. In another example, the pre-defined data can be a pattern and diagram for the same type of component 110. If the pattern and diagram based on data scanned from component 110 in source database 116 matches the pattern and diagram in the pre-defined data in reference database 118, verification module 114 may determine that component 110 is a correct component to be installed in receptacle 112. If the certain pattern and diagram based on sensor data sensor data scanned from component 110 in source database 116 fails to match the pattern and diagram in the pre-defined data in reference database 118, verification module 114 may determine that component 110 is not a correct component to be installed in receptacle 112. If the pattern and diagram based on sensor data sensor data scanned from component 110 in source database 116 is a mismatch with the pattern and diagram in the pre-defined data in reference database 118, verification module 114 may determine that component 110 may have damage.

In one or more embodiments of the present disclosure, verification module 114 is configured to indicate whether component 110 is to be installed into receptacle 112 or not. If component 110 is determined to be a correct component to install, verification module 114 may send a signal to indicator 106 turn on an indication, e.g., a green light, to indicate to install component 110. If component 110 is determined a wrong or damaged one, verification module 114 may send a signal to indicator 106 to turn on an indication, e.g., a red light, to indicate not to install component 110. In other embodiments, verification module 114 may signal component 110 being a correct one to install or not by indicator 106 to provide audio indication or other suitable indication such as a message. Verification module 114 may provide an indication through indicator 106 for installation of component 110 to receptacle 112. If verification module 114 determines that component 110 has no damage and is a correct type of component for receptacle 112, verification module 114 may provide an indication by indicator 106 for installation of component 110 to receptacle 112. If verification module 114 determines that component 110 has damage, verification module 114 may provide an alert to an installer, for example, by sending a red light or sound alert to the installer through indicator 106. If verification module 114 determines that component 110 is not the correct type of component to receptacle 112, verification module 114 may provide an alert to an installer, for example, by sending a red light or sound alert to the installer through indicator 106. In the depicted embodiment, indicator 106 is located externally from computing device 102. In other embodiments, indicator 106 can be located in computing device 102, sensor 104, receptacle 112, or other suitable places.

Figure 2:
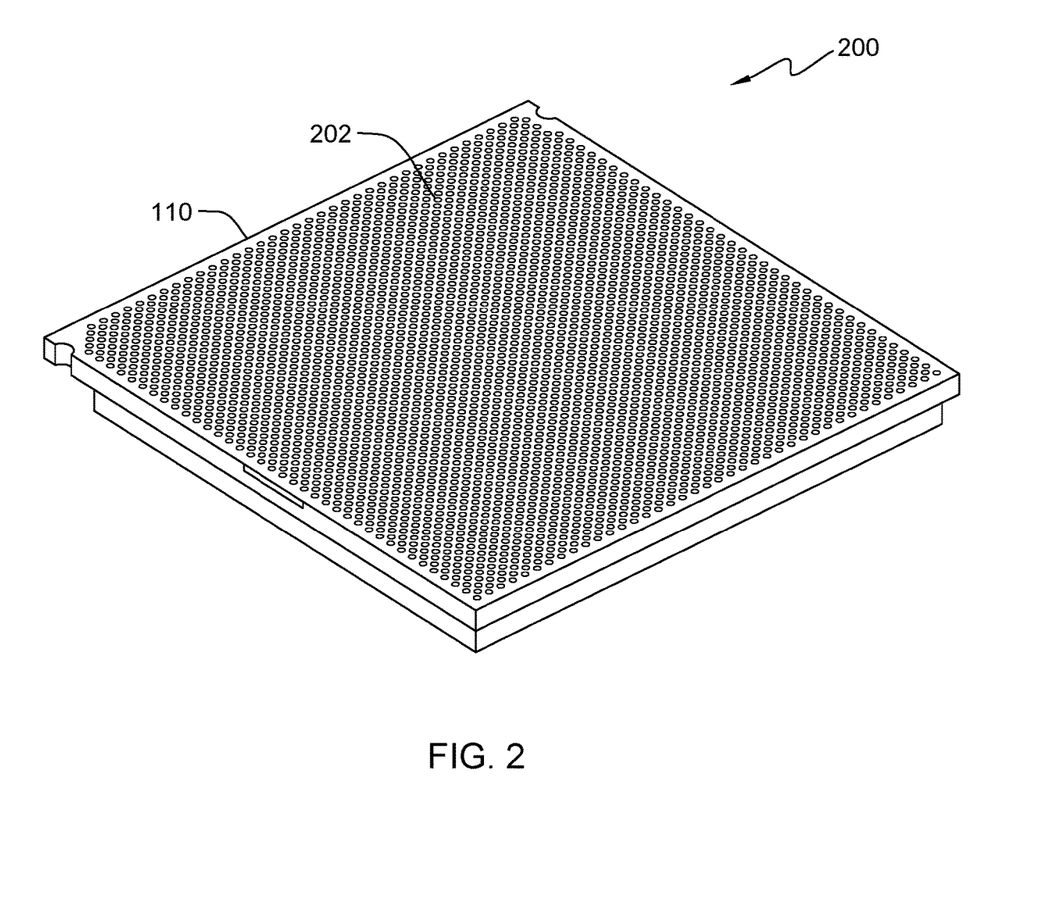
FIG. 2 is an example of a component in FIG. 1, in accordance with an embodiment of the present disclosure.

FIG. 2 is an example 200 of component 110 of FIG. 1, in accordance with an embodiment of the present disclosure.

In the example of FIG. 2, component 110 is a processor with a plurality of pins 202 underneath the processor. The plurality of pins 202 can have a certain pattern and diagram which can be used to identify the processor or the same type of the processor to be installed for receptacle 112. For example, pins 202 can be arranged in a pattern. Pins 202 can be pre-designed in a certain diagram. The arranged pattern and the pre-designed diagram can be used to identify the processor or the same type of the processors to be installed for receptacle 112. In an example, the number of pins 202 can be a few thousand or more. In another example, the number of pins 202 can be a few hundred or more. In another example, the number of pins 202 can be just one or more. The number of pins 202 can be used to identify the type of component 110 which is a right one to be installed in receptacle 112.

Figure 3:
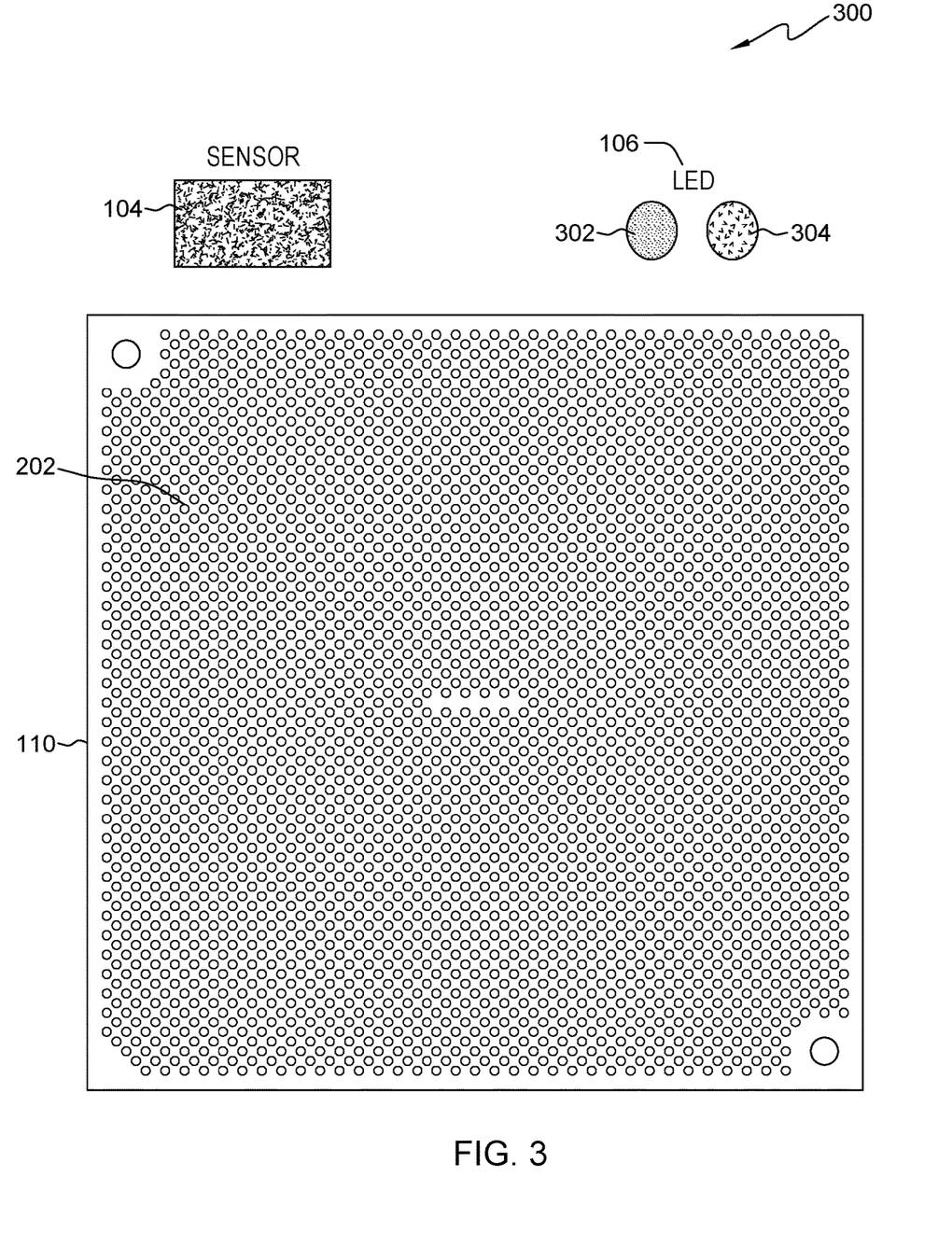
FIG. 3 is an example diagram illustrating a sensor, an indicator, and the component of FIG. 1, in accordance with an embodiment of the present disclosure.

FIG. 3 is an example diagram 300 illustrating sensor 104, indicator 106, and component 110 of FIG. 1, in accordance with an embodiment of the present disclosure.

In the example of FIG. 3, component 110 is a processor with a plurality of pins 202 underneath the processor. The plurality of pins 202 can have a certain pattern and diagram which can be used to identify the processor or the same kind of the processor to be installed for receptacle 112. For example, pins 202 can be arranged in a pattern. Pins 202 can be pre-designed in a certain diagram. The arranged pattern and the pre-designed diagram can be used to identify the processor or the same type of the processors to be installed for receptacle 112. In an example, the plurality of pins 202 can be a couple of hundreds. In another example, the plurality of pins 202 can be a few thousands or more. In another example, the plurality of pins 202 can be one or more. The number of pins 202 can be used to identify the type of component 110 which is a right one to be installed in receptacle 112.

Sensor 104 may be separated from component 110 and indicator 106. Sensor 104 may be located outside component 110. Sensor 104 may scan component 110 before component 110 is to be installed into receptacle 112. Sensor 104 may scan elements in component 110. For example, sensor 104 may scan a plurality of pins of component 110. The plurality of pins can have a certain pattern and diagram which can be used to identify component 110 or the same kind of component 110 for receptacle 112. Sensor 104 may send the scanned and captured data to computing device 102. In an example, sensor 104 can be an infrared sensor. In another example, sensor 104 can be an optical sensor that can capture the certain pattern and diagram of the plurality of pins. In yet another example, sensor 104 can be any suitable sensor that can capture the certain pattern and diagram of the plurality of pins which can be used to identify component 110 or the same kind of component 110 for receptacle 112. In yet another example, sensor 104 can be any suitable sensor that can scan and capture data of component 110 or the same kind of component 110 to check and verify if any damage is in component 110.

In the depicted embodiment, indicator 106 is a light-emitting diode (LED). Indicator 106 can indicate whether component 110 is to be installed into receptacle 112. If component 110 is determined to be a correct component to install, verification module 114 may send a signal to indicator 106 to turn on green light 304 to indicate to install component 110. If component 110 is determined an incorrect or damaged component, verification module 114 may send a signal to indicator 106 to turn on red light 302 to indicate not to install component 110. In other embodiments, indicator 106 can be configured to use different lights to indicate and alert whether component 110 should be installed or not. In other embodiments, indicator 106 can be audio indicators or any other suitable indicators.

Figure 4A:
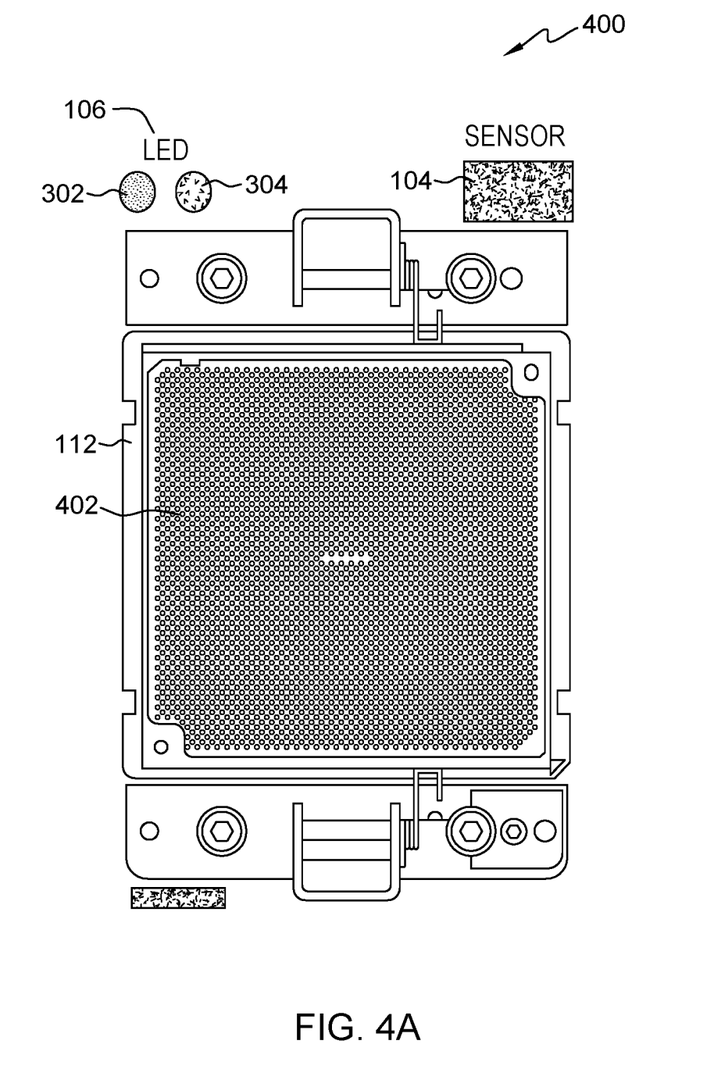
FIG. 4A is an example diagram illustrating the sensor, the indicator, and a receptacle of FIG. 1, in accordance with an embodiment of the present disclosure.

FIG. 4A is an example diagram 400 illustrating sensor 104, indicator 106, and receptacle 112 of FIG. 1, in accordance with an embodiment of the present disclosure.

In the example of FIG. 3, receptacle 112 is an electric circuitry system that component 110 is to be installed into. Receptacle 112 may have socket 402 to accept component 110. Socket 402 can be designed to accept a right component or the same kind of the right component for receptacle 112. In an example, socket 402 can have surface contact to accept pins 202 of component 110. In another example, socket 402 can have holes to accept pins 202 of component 110. In another example, socket 402 can have other suitable element to accept component 110.

Figure 4B:
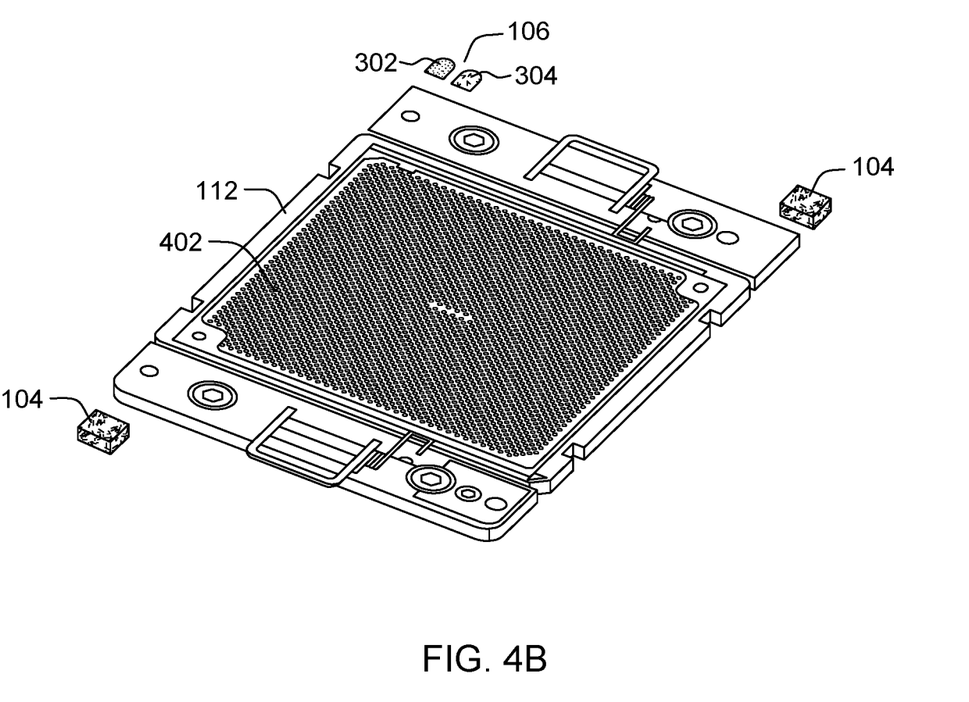
FIG. 4B is a simplified three-dimensional view of FIG. 4A illustrating the sensor, the indicator, and the receptacle of FIG. 1, in accordance with an embodiment of the present disclosure.

FIG. 4B is a simplified three-dimensional view of FIG. 4A illustrating sensor 104, indicator 106, and receptacle 112 of FIG. 1, in accordance with an embodiment of the present disclosure. In the depicted embodiment, sensor 104 can be one or more sensors.

Figure 5:
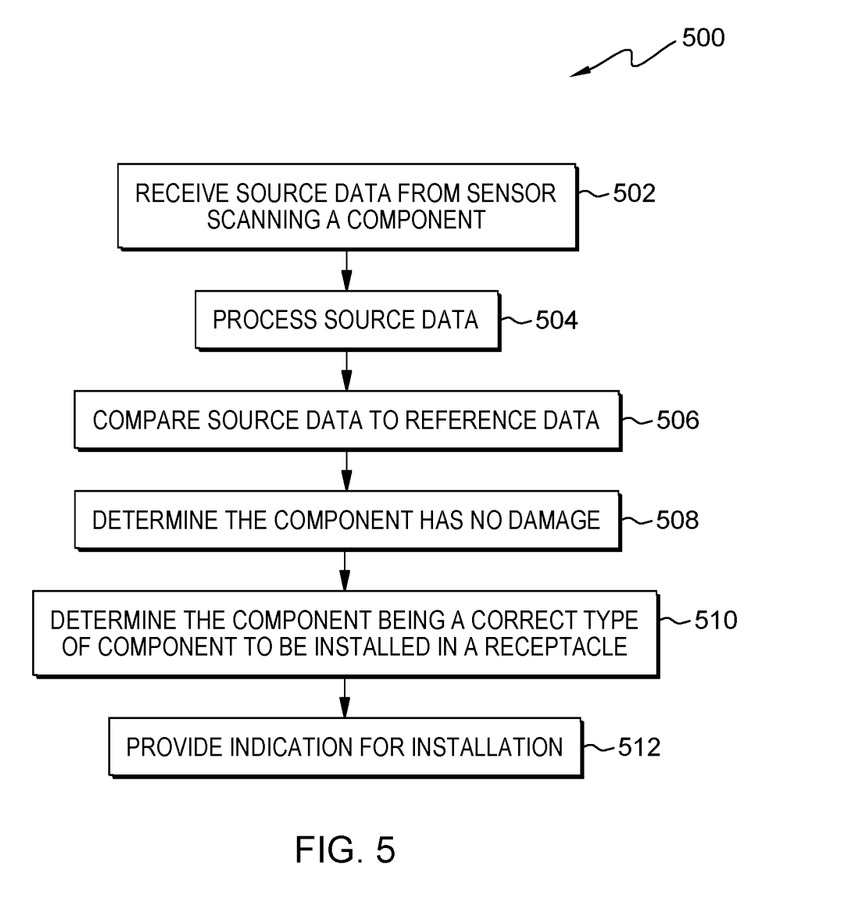
FIG. 5 is a flowchart depicting operational steps of a verification module included in a computing device of FIG. 1, in accordance with an embodiment of the present disclosure.

FIG. 5 is a flowchart 500 depicting operational steps of verification module 114 in accordance with an embodiment of the present disclosure.

Verification module 114 operates to receive sensor data sensor data from sensor 104. Verification module 114 also operates to process the sensor data sensor data received from sensor 104. Verification module 114 operates to compare sensor data sensor data received from sensor 104 to reference data from reference database 118. Verification module 114 operates to determine that component 110 has no damage by finding a match between sensor data sensor data from sensor 104 and reference data from reference database 118. Verification module 114 operates to determine that component 110 is a correct type of component to be installed in receptacle 112 by finding a match between the sensor data sensor data from sensor 104 and a reference data from reference database 118. The reference data may be a pre-defined data to define the correct type of components to be installed in receptacle 112. Verification module 114 operates to provide an indication for installation of component 110 to receptacle 112.

In step 502, verification module 114 receives sensor data sensor data from sensor 104. Verification module 114 may receive sensor data sensor data from sensor 104 scanning component 110 which is positioned to be installed in receptacle 112. Verification module 114 may capture the scanned data from sensor 104 when sensor 104 scans component 110. In an example, verification module 114 may save the scanned data to source database 116 to process and analyze. In another example, verification module 114 may process and analyze the scanned data without saving to source database 116. In an example, sensor 104 may scan component 110 when component 110 approaches receptacle 112. Sensor 104 may scan component 110 before component 110 is to be installed into receptacle 112. Sensor 104 may scan elements in component 110. For example, component 110 may have a plurality of pins. Sensor 104 may scan a plurality of pins of component 110. The plurality of pins can have a certain number, pattern and diagram which can be used to identify component 110 or the correct type of component 110 to be installed for receptacle 112. Sensor 104 may send the scanned data to verification module 114. In an example, sensor 104 can be an infrared sensor. In another example, sensor 104 can be an optical sensor that can capture the pattern and diagram of the plurality of pins. In yet another example, sensor 104 can be any suitable sensor that can scan and capture the certain pattern and diagram of the plurality of pins which can be used to identify component 110 or the correct type of component 110 to be installed for receptacle 112. In yet another example, sensor 104 can be any suitable sensor that can scan component 110 for checking and verifying if any damage has occurred to component 110.

In step 504, verification module 114 processes the sensor data sensor data received from sensor 104. Verification module 114 may process the sensor data sensor data received from sensor 104 via calculating the number of pins in component 110. Verification module 114 may process the sensor data sensor data received from sensor 104 via recognizing the pattern and diagram of component 110. Verification module 114 may analyze the data received from sensor 104 by comparing the sensor data sensor data received from sensor 104 to reference data from reference database 118. Reference database 118 is a database that includes reference data that may be pre-defined data associated with receptacle 112 and component 110. The pre-defined data may be data which can indicate a correct type of components 110 for installation for receptacle 112. The pre-defined data may be data which defines a physical damage status for component 110 or the type of component 110. The pre-defined data may be data which defines no physical damage for component 110 or the type of component 110. In an example, the pre-defined data for reference database 118 can be pre-collected through sensor 104 by scanning a pre-verified component and or pre-verified type of components for installation for receptacle 112. In another example, the pre-defined data for reference database 118 can be collected through other suitable methods for a pre-verified component and or pre-verified type of components for installation for receptacle 112.

In step 506, verification module 114 compares sensor data received from sensor 104 to reference data from reference database 118. Verification module 114 may compare source database 116 to reference database 118. Verification module 114 may compare the processed sensor data received from sensor 104 to reference data from reference database 118. Reference data in reference database 118 may be pre-collected data associated with component 110 and receptacle 112. The pre-collected data can identify component 110. For example, reference data can be used as a comparison to identify whether component 110 or the same kind of the component is a correct component to be supposed to be installed in receptacle 112. Reference database 118 may be a database that includes reference data that may be pre-defined data associated with receptacle 112 and component 110. In an example, the pre-defined data in reference database 118 can be pre-collected through sensor 104 by scanning a pre-verified component and or pre-verified type of components for installation for receptacle 112. In another example, the pre-defined data in reference database 118 can be collected through other suitable methods for a pre-verified component and or pre-verified type of components for installation for receptacle 112. The pre-defined data may be reference data which can indicate a correct type of components 110 for installation for receptacle 112 by the number of pins in the correct type of components 110. The pre-defined data may be reference data which can indicate a correct type of components 110 for installation for receptacle 112 by a pattern of the pins in the correct type of components 110. The pre-defined data may be reference data which can indicate a correct type of components 110 for installation for receptacle 112 by a diagram of the pins in the correct type of components 110. The pre-defined data may be reference data which defines a physical damage status for component 110 or the type of component 110. In an example, the pre-defined data may be reference data which can indicate a type of components 110 with no damage by the number of pins in the correct type of components 110. The pre-defined data may be reference data which can indicate a type of components 110 with no damage by a pattern of the pins in the correct type of components 110. The pre-defined data may be reference data which can indicate a type of components 110 with no damage by a diagram of the number of pins in the correct type of components 110.

In step 508, verification module 114 determines that component 110 has no damage by finding a match between sensor data from sensor 104 and reference data from reference database 118. The reference data defines no damage for the same type of component 110. For example, if verification module 114 finds source data, from sensor 104, matches a reference data, from reference database 118, and the reference data defines no damage for the same type of component 110, verification module 114 may determine that component 110 has no damage. In an example, reference data can be the number of pins for the same type of component as component 110. If the number of pins, based on sensor data scanned from component 110 in source database 116, matches the number of pins in the reference data in reference database 118, verification module 114 may determine that component 110 has no damage. If the number of pins, based on sensor data scanned from component 110 in source database 116, is different than the number of pins in the reference data in reference database 118, verification module 114 may determine that component 110 may be missing a pin and may have damage. If the number of pins, based on sensor data scanned from component 110 in source database 116, is a mismatch from the number of pins in the reference data in reference database 118, verification module 114 may determine that component 110 may have damage. In another example, reference data can be a pattern and diagram for the same type of component 110. If the pattern and diagram based on sensor data scanned from component 110 in source database 116 matches the pattern and diagram in the reference data in reference database 118, verification module 114 may determine that component 110 has no damage. If certain patterns and diagrams, based on sensor data scanned from component 110 in source database 116, are different than the patterns and diagrams from the reference data in reference database 118, verification module 114 may determine that component 110 may have damage.

In step 510, verification module 114 determines that component 110 is the correct type of component to be installed in receptacle 112 by finding a match between the sensor data from sensor 104 and a reference data from reference database 118. The reference data is a pre-defined data to define the correct type of components to be installed in receptacle 112. For example, if verification module 114 finds the data from sensor 104 is the same as the pre-defined data from reference database 118, verification module 114 may determine that component 110 is a correct component to be installed in receptacle 112. In an example, the pre-defined data can be the number of pins for the same type of component 110. If the number of pins, based on data scanned from component 110 in source database 116, is the same as the number of pins in the pre-defined data in reference database 118, verification module 114 may determine that component 110 is a correct component to be installed in receptacle 112. If the number of pins, based on data scanned from component 110 in source database 116, is different than the number of pins in the pre-defined data in reference database 118, verification module 114 may determine that component 110 is not a correct component to be installed in receptacle 112. In another example, the pre-defined data can be the certain pattern and diagram for the same type of component as component 110. If the certain pattern and diagram based on data scanned from component 110 in source database 116 is the same as the certain pattern and diagram in the pre-defined data in reference database 118, verification module 114 may determine that component 110 is a correct component to be installed in receptacle 112. If the certain pattern and diagram based on data scanned from component 110 in source database 116 is different from the certain pattern and diagram in the pre-defined data in reference database 118, verification module 114 may determine that component 110 is not a correct component to be installed in receptacle 112.

In step 512, verification module 114 provides an indication for installation of component 110 to receptacle 112. If verification module 114 determines that component 110 has no damage and is a correct type of component for receptacle 112, verification module 114 provides an indication for installation of component 110 to receptacle 112. If verification module 114 determines that component 110 has a damage, verification module 114 may provide an alert to an installer, for example, by sending a red light or sound alert to the installer through indicator 106. If verification module 114 determines that component 110 is not the correct type of component to receptacle 112, verification module 114 may provide an alert to an installer, for example, by sending a red light or sound alert to the installer through indicator 106.

Figure 6:
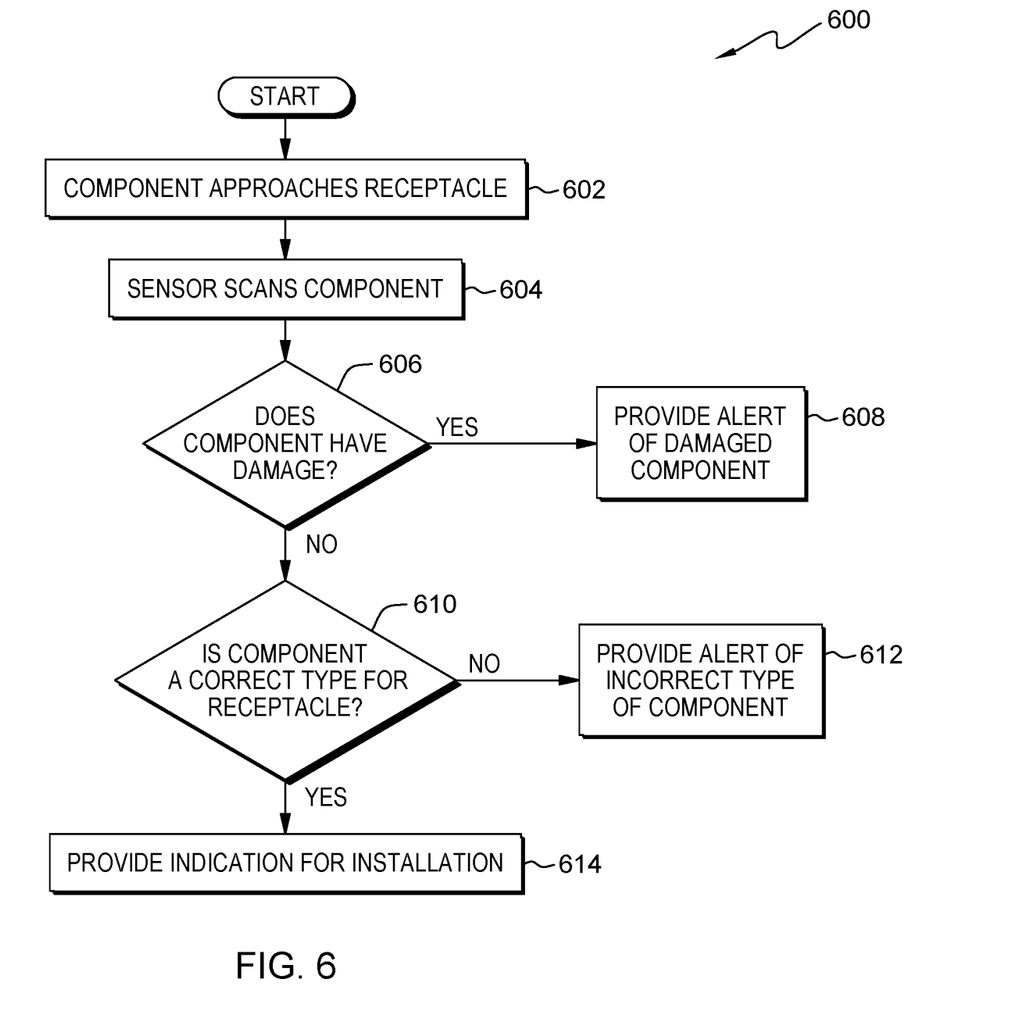
FIG. 6 is a flowchart depicting an example component installation process in the component installation verification environment of FIG. 1, in accordance with an embodiment of the present disclosure.

FIG. 6 is a flowchart 600 depicting an example component installation process in component installation verification environment 100, in accordance with an embodiment of the present disclosure.

In the example of FIG. 6, in step 602, component 110 approaches receptacle 112 to be installed. In an example, component 110 may be put on top of receptacle 112 prior to being installed by a user.

In step 604, sensor 104 scans component 110 when component 110 approaches receptacle 112. Sensor 104 may scan component 110 right before component 110 is to be installed into receptacle 112. Sensor 104 may scan elements in component 110. For example, sensor 104 may scan a plurality of pins of component 110. The plurality of pins can have a certain amount, pattern and diagram which can be used to identify component 110 or the correct type of component 110 to be installed for receptacle 112. Sensor 104 may send the scanned data to verification module 114. In an example, sensor 104 can be an infrared sensor. In another example, sensor 104 can be an optical sensor that can capture the certain pattern and diagram of the plurality of pins. In yet another example, sensor 104 can be any suitable sensor that can scan and capture the certain pattern and diagram of the plurality of pins which can be used to identify component 110 or the correct type of component 110 to be installed for receptacle 112. In yet another example, sensor 104 can be any suitable sensor that can scan component 110 for checking and verifying if any damage is in component 110.

In step 606, verification module 114 determines whether component 110 has damage. Verification module 114 may determine that component 110 has no damage by finding a match between the data scanned from sensor 104 and a pre-defined data, from reference database 118, which corresponds to the same type of component, as component 110, without damage. For example, if verification module 114 receives the data from sensor 104 matches pre-defined data from reference database 118, verification module 114 may determine that component 110 has no damage. In an example, the pre-defined data can be the number of pins for the same type of component as component 110. If the number of pins, based on data scanned from component 110 in source database 116, matches the number of pins in the pre-defined data in reference database 118, computing device 102 may determine that component 110 has no damage. If the number of pins, based on data scanned from component 110 in source database 116, is different from the number of pins in the pre-defined data in reference database 118, computing device 102 may determine that component 110 may have missed a pin and may have damage. In another example, the pre-defined data can be the certain pattern and diagram for the same type of component 110. If the certain pattern and diagram, based on data scanned from component 110 in source database 116, matches the certain pattern and diagram in the pre-defined data in reference database 118, computing device 102 may determine that component 110 has no damage. If the certain pattern and diagram, based on data scanned from component 110 in source database 116, is different from the certain pattern and diagram in the pre-defined data in reference database 118, computing device 102 may determine that component 110 may have damage.

In step 608, if computing device 102 determines that component 110 has damage, computing device 102 communicates to indicator 106 to give an alert to the installer. In an example, indicator 106 may deliver a light alert, e.g., a red-light alert. In another example, indicator 106 may deliver an audio alert. In another example, indicator 106 may deliver any suitable alert.

In step 610, computing device 102 determines whether component 110 is the correct type of component to be installed in receptacle 112. Computing device 102 may determine that component 110 is a correct type of component by finding a match between the data from sensor 104 and a pre-defined data from reference database 118. The pre-defined data defines the correct type of components to be installed in receptacle 112. For example, if computing device 102 finds the data from sensor 104 matches the pre-defined data from reference database 118, computing device 102 may determine that component 110 is a correct component to be installed in receptacle 112. In an example, the pre-defined data can be the number of pins for the same type of component 110. If the number of pins, based on data scanned from component 110 in source database 116, matches the number of pins in the pre-defined data in reference database 118, computing device 102 may determine that component 110 is a correct component to be installed in receptacle 112. If the number of pins, based on data scanned from component 110 in source database 116, is different from the number of pins in the pre-defined data in reference database 118, computing device 102 may determine that component 110 is not a correct component to be installed in receptacle 112. In another example, the pre-defined data can be the certain pattern and diagram for the same type of component 110. If the certain pattern and diagram, based on data scanned from component 110 in source database 116, is determined to match the certain pattern and diagram in the pre-defined data in reference database 118, computing device 102 may determine that component 110 is a correct component to be installed in receptacle 112. If the certain pattern and diagram, based on data scanned from component 110 in source database 116, is determined to not match the certain pattern and diagram in the pre-defined data in reference database 118, computing device 102 may determine that component 110 is not a correct component to be installed in receptacle 112.

In step 612, if computing device 102 determines that component 110 is not a correct type of component to be installed in receptacle 112, computing device 102 communicates to indicator 106 to give an alert to the installer. In an example, indicator 106 may deliver a red-light alert. In another example, indicator 106 may deliver an audio alert. In another example, indicator 106 may deliver any suitable alert to warn the installer.

In step 614, computing device 102 provides indication for installation. Computing device 102 may provide indication for installation when computing device 102 determines that component 110 has no damage and component 110 is a correct type of component to be installed in receptacle 112. Computing device 102 may provide indication for installation through indicator 106. Computing device 102 may communicate to indicator 106 to give an indication for installation. In an example, indicator 106 may deliver a green light for indicating installation. In another example, indicator 106 may deliver audio to tell the installer to continue the installation of component 110 to receptacle 112. In another example, indicator 106 may deliver any suitable indication to inform the staller to continue the installation of component 110 to receptacle 112.

Figure 7:
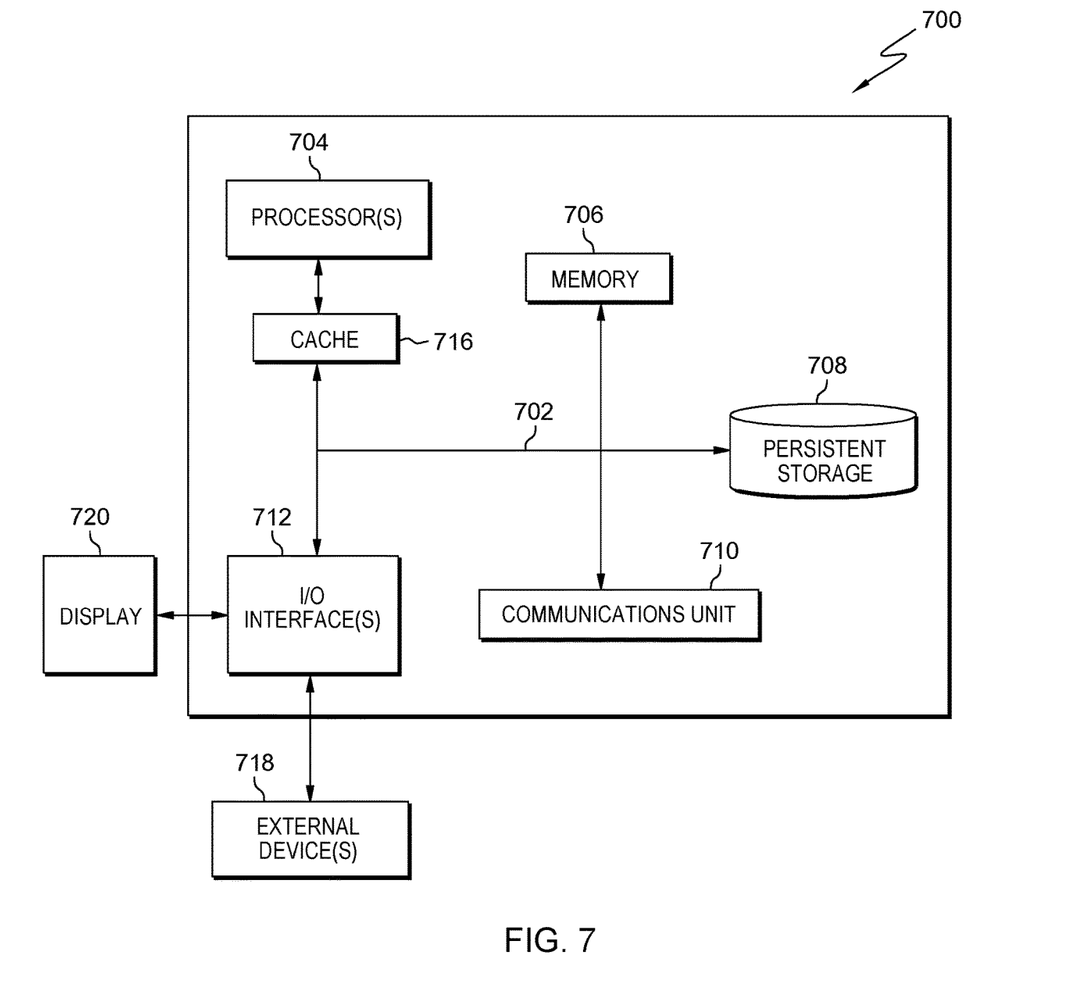
FIG. 7 is a block diagram of components of the computing device of FIG. 1, in accordance with an embodiment of the present disclosure.

FIG. 7 depicts a block diagram 700 of components of computing device 102 in accordance with an illustrative embodiment of the present disclosure. It should be appreciated that FIG. 7 provides only an illustration of one implementation and does not imply any limitations with regard to the environments in which different embodiments may be implemented. Many modifications to the depicted environment may be made.

Computing device 102 may include communications fabric 702, which provides communications between cache 716, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses or a crossbar switch.

Memory 706 and persistent storage 708 are computer readable storage media. In this embodiment, memory 706 includes random access memory (RAM). In general, memory 706 can include any suitable volatile or non-volatile computer readable storage media. Cache 716 is a fast memory that enhances the performance of computer processor(s) 704 by holding recently accessed data, and data near accessed data, from memory 706.

Verification module 114 may be stored in persistent storage 708 and in memory 706 for execution by one or more of the respective computer processors 704 via cache 716. In an embodiment, persistent storage 408 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices. In these examples, communications unit 710 includes one or more network interface cards. Communications unit 710 may provide communications through the use of either or both physical and wireless communications links. Verification module 114 may be downloaded to persistent storage 708 through communications unit 710.

I/O interface(s) 712 allows for input and output of data with other devices that may be connected to computing device 102. For example, I/O interface 712 may provide a connection to external devices 718 such as a keyboard, keypin, a touch screen, and/or some other suitable input device. External devices 718 can also include portable computer readable storage media such as, for example, thumb drives, portable optical or magnetic disks, and memory cards. Software and data used to practice embodiments of the present invention, e.g., verification module 114 can be stored on such portable computer readable storage media and can be loaded onto persistent storage 408 via I/O interface(s) 712. I/O interface(s) 712 also connect to display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
receiving, by one or more processors, sensor data from a sensor scanning a component, the component to be installed into a receptacle;
comparing, by one or more processors, the sensor data to reference data, the reference data being pre-collected data associated with the type of the component and the type of the receptacle, the reference data defining the correct type of the component to be installed in the receptacle, the reference data defining a damage status of the type of the component;
determining, by one or more processors, whether the component has damage;
determining, by one or more processors, whether the component is a correct type of component to be installed in the receptacle; and
providing, by one or more processors, an indication for installation.

2. The computer-implemented method of claim 1, wherein comparing the sensor data to the reference data comprises comparing a number of pins of the component detected from the sensor data to a number of pins pre-defined in the reference data for the correct type of component.

3. The computer-implemented method of claim 1, wherein comparing the sensor data to the reference data comprises comparing a diagram of the component detected from the sensor data to a pre-defined diagram in the reference data for the correct type of component.

4. The computer-implemented method of claim 1, wherein the reference data is pre-defined data that defines a number of one or more pins for a correct type of component to be installed in the receptacle.

5. The computer-implemented method of claim 1, wherein the reference data is pre-defined data that defines a diagram for a correct type of component to be installed in the receptacle.

6. The computer-implemented method of claim 1, wherein, responsive to determining that the component has damage, providing the indication comprises generating an alert.

7. The computer-implemented method of claim 1, wherein, responsive to determining that the component is an incorrect type of component to be installed to the receptacle, providing the indication comprises generating an alert.

8. A computer program product comprising:
one or more computer readable storage media, and program instructions collectively stored on the one or more computer readable storage media, the program instructions comprising:
program instructions to receive sensor data from a sensor scanning a component, the component to be installed into a receptacle;
program instructions to compare the sensor data to reference data, the reference data being pre-collected data associated with the type of the component and the type of the receptacle, the reference data defining the correct type of the component to be installed in the receptacle, the reference data defining a damage status of the type of the component;
program instructions to determine whether the component has damage;
program instructions to determine whether the component is a correct type of component to be installed in the receptacle; and
program instructions to provide an indication for installation.

9. The computer program product of claim 8, wherein comparing the sensor data to the reference data comprises comparing a number of pins of the component detected from the sensor data to a number of pins pre-defined in the reference data for the correct type of component.

10. The computer program product of claim 8, wherein comparing the sensor data to the reference data comprises comparing a diagram of the component detected from the sensor data to a pre-defined diagram in the reference data for the correct type of component.

11. The computer program product of claim 8, wherein the reference data is pre-defined data that defines a number of one or more pins for a correct type of component to be installed in the receptacle.

12. The computer program product of claim 8, wherein the reference data is pre-defined data that defines a diagram for a correct type of component to be installed in the receptacle.

13. The computer program product of claim 8, wherein, responsive to determining that the component has damage, providing the indication comprises generating an alert.

14. The computer program product of claim 8, wherein, responsive to determining that the component is an incorrect type of component to be installed to the receptacle, providing the indication comprises generating an alert.

15. A computer system comprising:
one or more computer processors, one or more computer readable storage media, and program instructions stored on the one or more computer readable storage media for execution by at least one of the one or more computer processors, the program instructions comprising:
program instructions to receive sensor data from a sensor scanning a component, the component to be installed into a receptacle;
program instructions to compare the sensor data to reference data, the reference data being pre-collected data associated with the type of the component and the type of the receptacle, the reference data defining the correct type of the component to be installed in the receptacle, the reference data defining a damage status of the type of the component;
program instructions to determine whether the component has damage;
program instructions to determine whether the component is a correct type of component to be installed in the receptacle; and
program instructions to provide an indication for installation.

16. The computer system of claim 15, wherein comparing the sensor data to the reference data comprises comparing a number of pins of the component detected from the sensor data to a number of pins pre-defined in the reference data for the correct type of component.

17. The computer system of claim 15, wherein comparing the sensor data to the reference data comprises comparing a diagram of the component detected from the sensor data to a pre-defined diagram in the reference data for the correct type of component.

18. The computer system of claim 15, wherein the reference data is pre-defined data that defines a diagram for a correct type of component to be installed in the receptacle.

19. The computer system of claim 15, wherein, responsive to determining that the component has damage, providing the indication comprises generating an alert.

20. The computer system of claim 15, wherein, responsive to determining that the component is an incorrect type of component to be installed to the receptacle, providing the indication comprises generating an alert.

\* \* \* \* \*